US012329055B2

(12) United States Patent
Harmon et al.

(10) Patent No.: US 12,329,055 B2
(45) Date of Patent: *Jun. 17, 2025

(54) AIR CART WITH ANTI-PULSING ROLLER DRIVETRAIN

(71) Applicant: DEERE & COMPANY, Moline, IL (US)

(72) Inventors: Andrew W. Harmon, Davenport, IA (US); Matt D. Bartelson, Bettendorf, IA (US)

(73) Assignee: Deere & Company, Moline, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/460,792

(22) Filed: Sep. 5, 2023

(65) Prior Publication Data
US 2024/0057512 A1    Feb. 22, 2024

Related U.S. Application Data

(63) Continuation of application No. 16/868,985, filed on May 7, 2020, now Pat. No. 11,758,835.

(51) Int. Cl.
| | | |
|---|---|---|
| *A01C 7/08* | (2006.01) | |
| *A01C 7/10* | (2006.01) | |
| *A01C 7/12* | (2006.01) | |
| *A01C 17/00* | (2006.01) | |
| *A01M 21/04* | (2006.01) | |

(52) U.S. Cl.
CPC ............. *A01C 7/081* (2013.01); *A01C 7/102* (2013.01); *A01C 7/12* (2013.01); *A01C 17/006* (2013.01); *A01M 21/043* (2013.01)

(58) Field of Classification Search
CPC .......... A01C 7/081; A01C 7/102; A01C 7/12; A01C 17/006; A01C 7/08; A01C 7/00; A01C 7/10; A01C 17/00; A01M 21/043; A01M 21/04; A01M 21/00
See application file for complete search history.

(56) References Cited

U.S. PATENT DOCUMENTS

| | | | |
|---|---|---|---|
| 6,586,898 | B2 | 7/2003 | King et al. |
| 8,452,522 | B2 | 5/2013 | Gao et al. |
| 9,178,462 | B2 | 11/2015 | Kurosawa et al. |

(Continued)

OTHER PUBLICATIONS

European Search Report and Written Opinion issued in EP Application No. 21171322.7; Date: Sep. 15, 2021; pp. 1-9.

*Primary Examiner* — Christopher J. Novosad
(74) *Attorney, Agent, or Firm* — Taft Stettinius & Hollister LLP; Stephen F. Rost

(57) ABSTRACT

An agricultural implement and a metering apparatus for the agricultural implement to deliver a material to a material depositing apparatus. The metering apparatus includes metering roller, an integrated motor operatively connected to the metering roller, and a motor drive operatively connected to the integrated motor. A controller is operatively connected to the integrated motor and to the motor drive wherein the controller transmits a drive signal to drive the integrated motor and receives a status signal from the integrated motor. The drive signals drives the motor, which includes the roller coupled to a motor spindle, at a variable rate of speed to reduce pulsing. In one embodiment, the agricultural implement is an air cart.

20 Claims, 10 Drawing Sheets

(56) References Cited

U.S. PATENT DOCUMENTS

| | | | |
|---|---|---|---|
| 11,758,835 B2 * | 9/2023 | Harmon .................. | A01C 7/12 |
| | | | 111/176 |
| 2017/0273235 A1 | 9/2017 | Kordick | |
| 2019/0045705 A1 | 2/2019 | Gilstring | |
| 2019/0313573 A1 | 10/2019 | Kordick | |

* cited by examiner

AIR CART WITH ANTI-PULSING ROLLER DRIVETRAIN

RELATED APPLICATIONS

This application is a continuation of U.S. patent application Ser. No. 16/868,985, filed May 7, 2020, entitled "AIR CART WITH ANTI-PULSING ROLLER DRIVETRAIN," the disclosure of which is hereby incorporated by reference in its entirety.

FIELD OF THE DISCLOSURE

The present disclosure relates to an air cart, and more particularly to agricultural air carts having a metering system for dispensing material, such as seeds or fertilizer.

BACKGROUND OF THE DISCLOSURE

Air carts are commonly towed by an agricultural tractor, to apply a material such as seed, fertilizer and/or herbicide to a field. An air cart is a wheeled cart which includes one or more frame-mounted tanks for holding the material. Air carts are also known as air seeders. In one embodiment of an air cart, the cart includes multiple separate tanks. In another embodiment the air cart includes a single tank having divided internal compartments. The air cart is typically towed in combination with a tilling implement, such as an air drill, one behind the other, to place the seed and fertilizer at or beneath the surface of the soil. Air carts include a metering system for dispensing material from the tanks and a pneumatic distribution system for delivering the material from the tanks to the soil. A fan provides at least one airstream which flows through the pneumatic distribution system. Material is first introduced to the air stream by the metering system at a primary distribution manifold located below the metering system.

The tanks of the air carts are formed with bottom surfaces that slope downward for the granular material to move toward the metering system. Gravity, in combination with the vibrations and movement of the air cart, acts to move the seed or granular material from the side or sides of the tank toward the metering system located toward the center of the tank. Material is moved by the air stream through distribution lines to a series of secondary distribution manifolds, which in turn distribute the material through distribution lines to material boots mounted behind ground openers on the tilling implement to evenly deliver the material, seed or fertilizer to the ground, which is tilled by the tilling implement.

Air carts typically deliver the material to one or more metering devices each including a roller section located within a housing having an input and an output. The material is delivered to a rotating roller having a plurality of chambers, each of which receives material at the input received from one of the tanks. As the roller rotates, each of the chambers receives a quantity of material. As roller continues to rotate, each chamber deposits its quantity of material to the output which is delivered to one of the distribution lines.

As the roller rotates, material held in each of the chambers is released relatively rapidly under the influence of gravity. Because the material drops from its associated chamber relatively rapidly and while not instantaneous, the release of the material from the chamber appears as a pulse of material. No material or at least a reduced amount of material is dropped on either side of the pulse of material and consequently, the flow of material is not constant. The pulsing appears as a visible change in material flow exiting the chamber of the roller when the motor is spinning the metering roller at a constant angular velocity. Pulsing is more pronounced at low roller speeds, which correspond to low rates or low travel speeds of the air cart. Because of the pulsing effect, the material directed to the soil is not evenly applied. Such uneven application of material can reduce the quantity as well as the quality of the crop being grown. What is needed, therefore, is an air cart that deposits material, such as seed and fertilizer, at a relatively constant rate to improve crop production.

SUMMARY

According to one embodiment, there is provided a metering apparatus to deposit a material provided by an agricultural implement. The metering apparatus includes a motor drive having a drive input and a drive output, a motor including a spindle, a motor input operatively connected to the drive output, and a motor output. A metering roller is operatively connected to the spindle, wherein the metering roller is configured to deposit the material. A controller is operatively connected to the drive input and operatively connected to the motor output, wherein the controller receives a motor status signal from the motor output and transmits a motor drive signal to the motor drive to cause the motor to drive the metering roller at a variable rate to reduce variations in mass flow rate of the material being deposited.

In another embodiment, there is provided an air cart to deliver defined portions of a material from a larger quantity of the material to a material depositing apparatus. The air cart includes a tube defining a conduit having a first end, a second end, and an opening therebetween. A fan is operatively connected to the tube at the first end to deliver a flow of air through the conduit. A receiver is operatively connected to the opening and a metering roller is disposed adjacently to the opening. A motor is operatively connected to the metering roller, wherein the motor includes a motor input, a motor output, and a spindle operatively connected to the metering roller. A motor drive includes a drive output operatively connected to the motor input and a drive input. A controller is operatively connected to the drive input of the motor drive and is operatively connected to the motor output of the motor, wherein the controller transmits a motor drive signal to cause the motor drive to drive the motor and receives a motor status signal from the motor output of the motor.

In a further embodiment, there is provided a method of metering the flow of a material dispensed from an air cart and delivered to a commodity cart. The method includes: agitating the material in the air cart to provide a loose aggregate of the material; delivering the material to a metering roller; rotating the metering roller at a variable velocity; and delivering the material from the metering roller to a housing for delivery to the commodity cart.

BRIEF DESCRIPTION OF THE DRAWINGS

The above-mentioned aspects of the present invention and the manner of obtaining them will become more apparent and the invention itself will be better understood by reference to the following description of the embodiments of the invention, taken in conjunction with the accompanying drawings, wherein.

Corresponding reference characters indicate corresponding parts throughout the several view. The exemplifications set out herein illustrate embodiments of the invention, and such exemplifications are not to be construed as limiting the scope of the invention in any manner.

DETAILED DESCRIPTION

Figure 1:
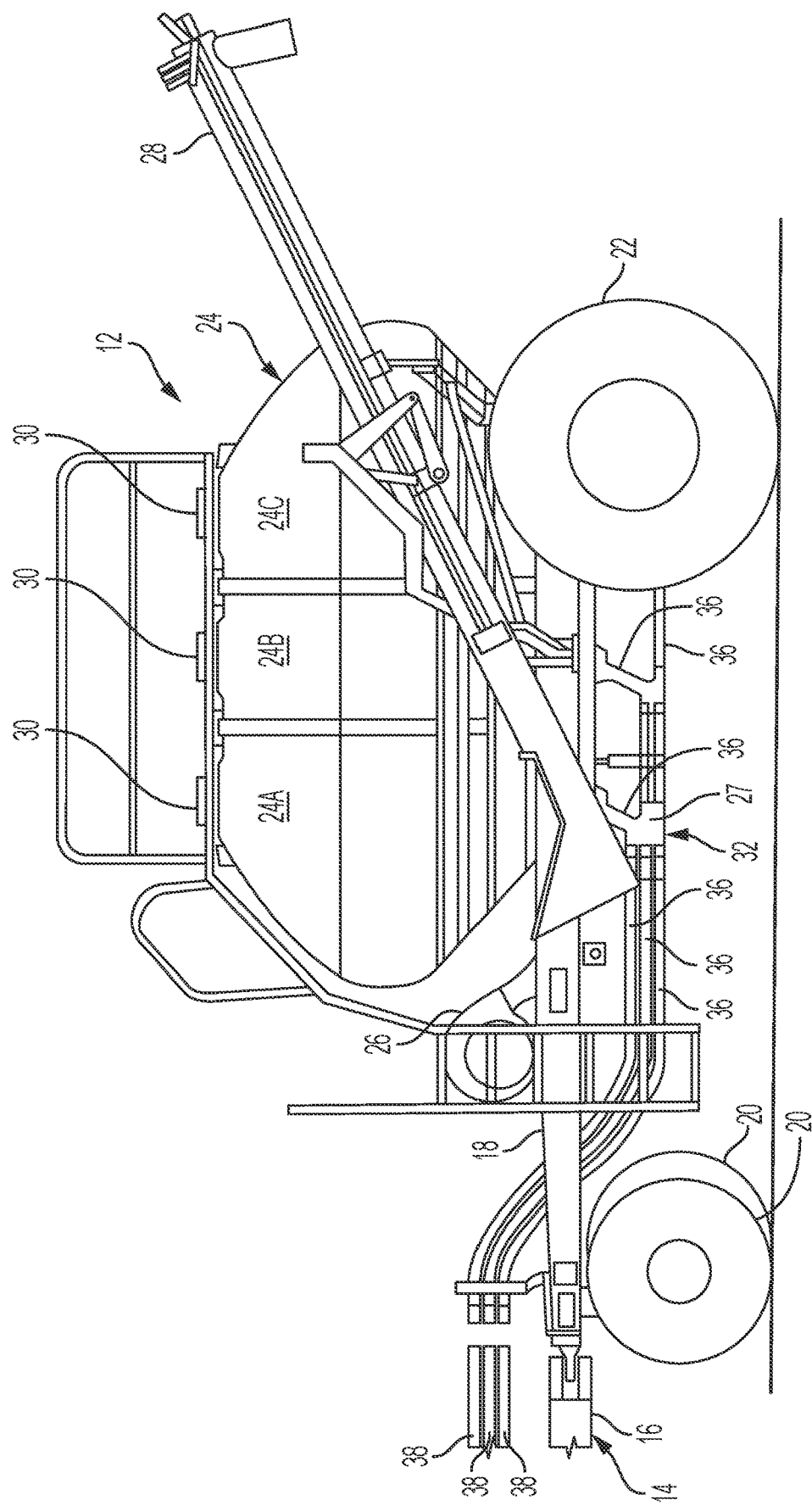
FIG. 1 is a side elevational view of an agricultural vehicle.

For the purposes of promoting an understanding of the principles of the novel invention, reference will now be made to the embodiments described herein and illustrated in the drawings and specific language will be used to describe the same. It will nevertheless be understood that no limitation of the scope of the novel invention is thereby intended, such alterations and further modifications in the illustrated devices and methods, and such further applications of the principles of the novel invention as illustrated therein being contemplated as would normally occur to one skilled in the art to which the novel invention relates.

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

FIG. 1 is a side elevational view of an agricultural vehicle, and more particularly an air cart 12, also known as an air seeder. Air cart 12 is towed by an air tool 14 with a portion of a rear hitch 16 illustrated in FIG. 1. The air tool 14 in one embodiment is an air drill but can be configured differently in other embodiments. The air tool 14 is also known as a commodity cart. In one embodiment, the air tool 14 includes a planter and the air cart 12 can be used to refill mini-hoppers on the planter. Air cart 12 can also include a rear hitch allowing air cart 12 to be towed in front of, rather than behind, tilling air tool 14. In different embodiments, the air tool deposits materials of different sizes and shapes.

While an air cart is described, the present disclosure is not limited to air carts and includes other types of agricultural implements, including but not limited to self-propelled nutrient applicators, planter-fertilizer systems, and seeding tools with onboard storage.

Air cart 12 includes a frame 18 which in turn includes front wheels 20, rear wheels 22, tank 24, blower 26, and auger 28. In the illustrated form, the tank 24 includes three separate mini-tanks or compartments 24A, 24B, and 24C with each mini-tank or compartment containing a material that is to be deposited or placed into or on the soil. Some materials include, but are not limited to, seed, fertilizer, insecticide, and herbicide. Each mini-tank or compartment 24A, 24B, and 24C has a top lid 30 that can be opened to fill the mini-tanks 24A, 24B, and 24C with material and then closed.

Air cart 12 includes a pneumatic distribution system 32 for delivering the air-entrained materials to the soil where trenches or rows have been formed by the tilling implement 14. Pneumatic distribution system 32 includes a metering system 27, one or more blowers 26 and a plurality of air lines 36, also known distribution lines. The metering system 27 dispenses material from the tanks 24A, 24B, and 24C into one or more manifolds 58 (see FIG. 2) which directs the material into one of the plurality of air lines 36, and from there the material is conveyed to the air seeder via a plurality of air lines 36. Although the illustrated embodiment of FIG. 1 includes three air lines 36, it is contemplated that in other embodiments, such as is illustrated in FIG. 2, a corresponding number of air lines 36 is used to transfer material from the tanks 24 to the tilling implement 14.

Figure 2:
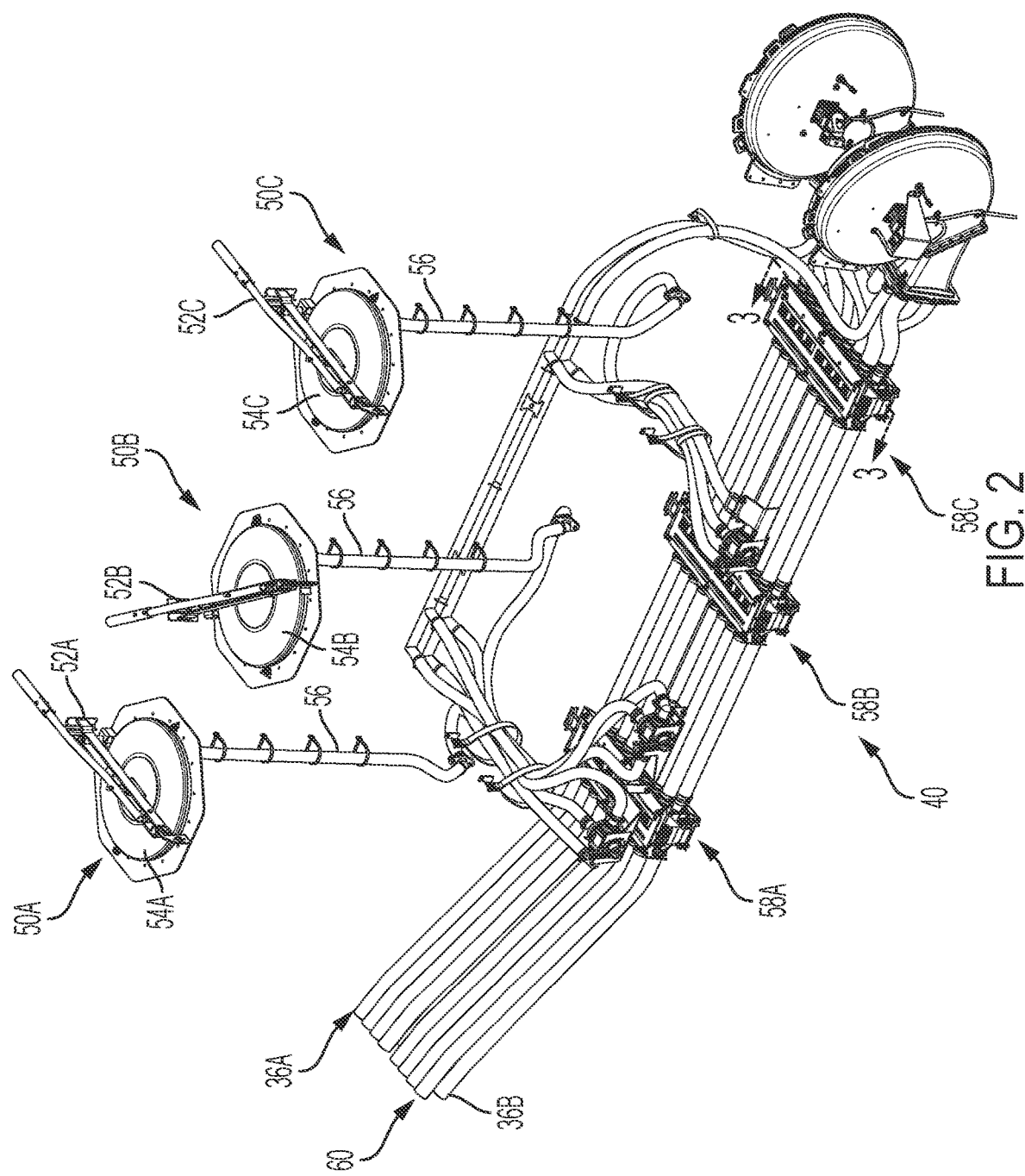
FIG. 2 is a partial schematic view of a distribution apparatus of an air cart.

As illustrated in a schematic view of FIG. 2, a distribution apparatus 40 is operatively connected to each of the tanks 24 of the air cart 12. The tank containers are not shown. Each tank 24 is connected to a manifold assembly 58. The manifold assemblies receive the commodity from metering rollers 70 (See FIG. 4) and deliver it to one of several groupings of conveyance lines 36A, 36B, 36C, etc. Each manifold assembly contains a plurality of individual manifolds corresponding to the number of metering rollers 70. Each individual manifold receives commodity from an individual metering roller and diverts it to one conveyance line from either 36A, 36B, 36C, etc. with louver 82 (See FIG. 5).

Figure 3:
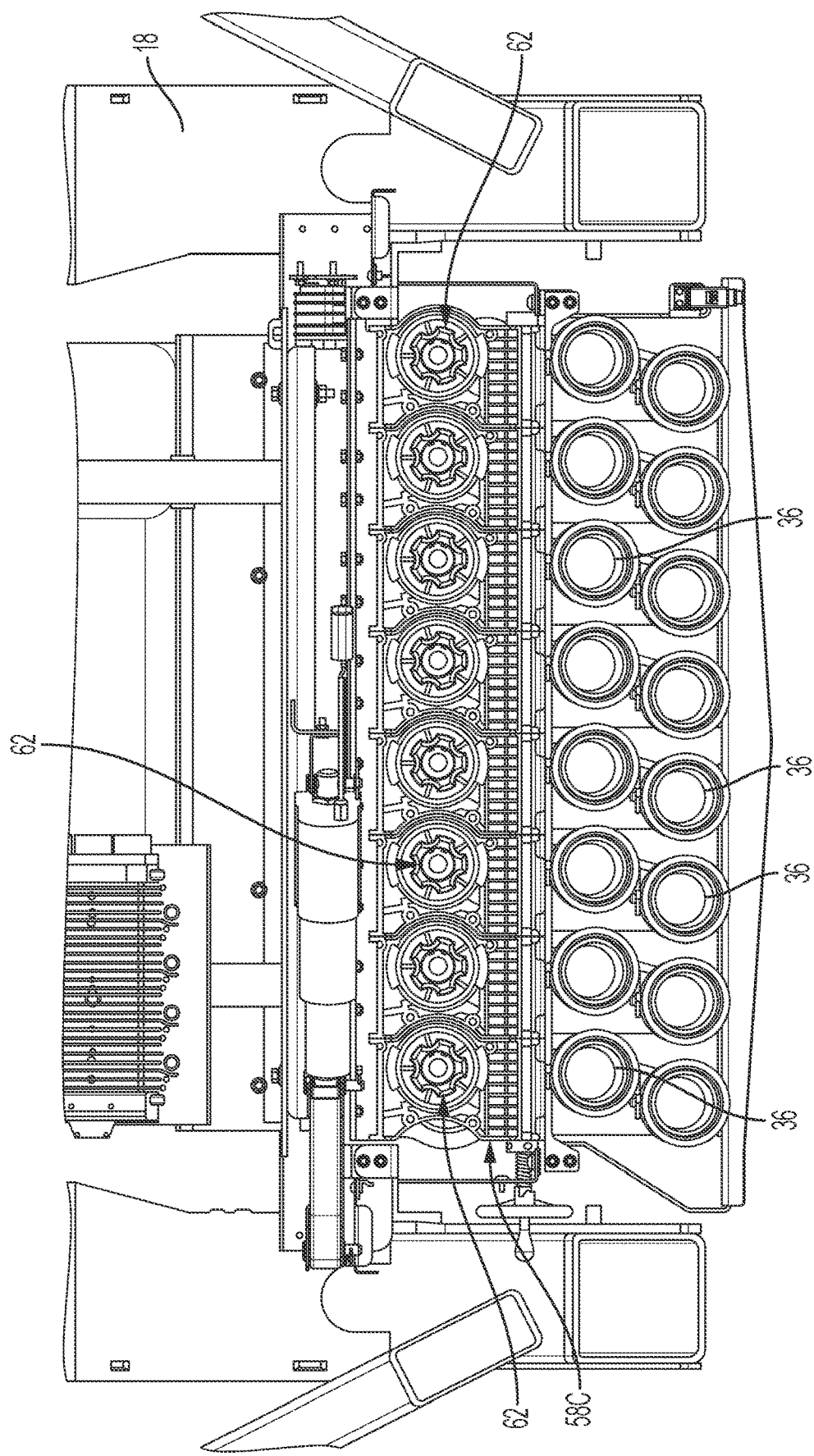
FIG. 3 is a section view of the distribution apparatus of FIG. 2 taken along lines 3-3.

FIG. 3 illustrates a section view of FIG. 2 taken along lines 3-3. Each of the distribution lines 36 defines a channel through which the blowers deliver forced air and through which material is delivered by the manifold 58C to outlets 60 (See FIG. 2) of the distribution lines 36. The distribution lines 36 are supported by the frame 18 and the set 36B is located below the set 36A. Distribution line set 36A subtends the manifold 58C which includes individual mounting structures to each support one of a roller drivetrain 62. As seen in FIG. 3, eight (8) roller drivetrains 62 are supported by the single manifold 58C. Each of the roller drivetrains includes a motor 64 (See FIG. 4).

Figure 4:
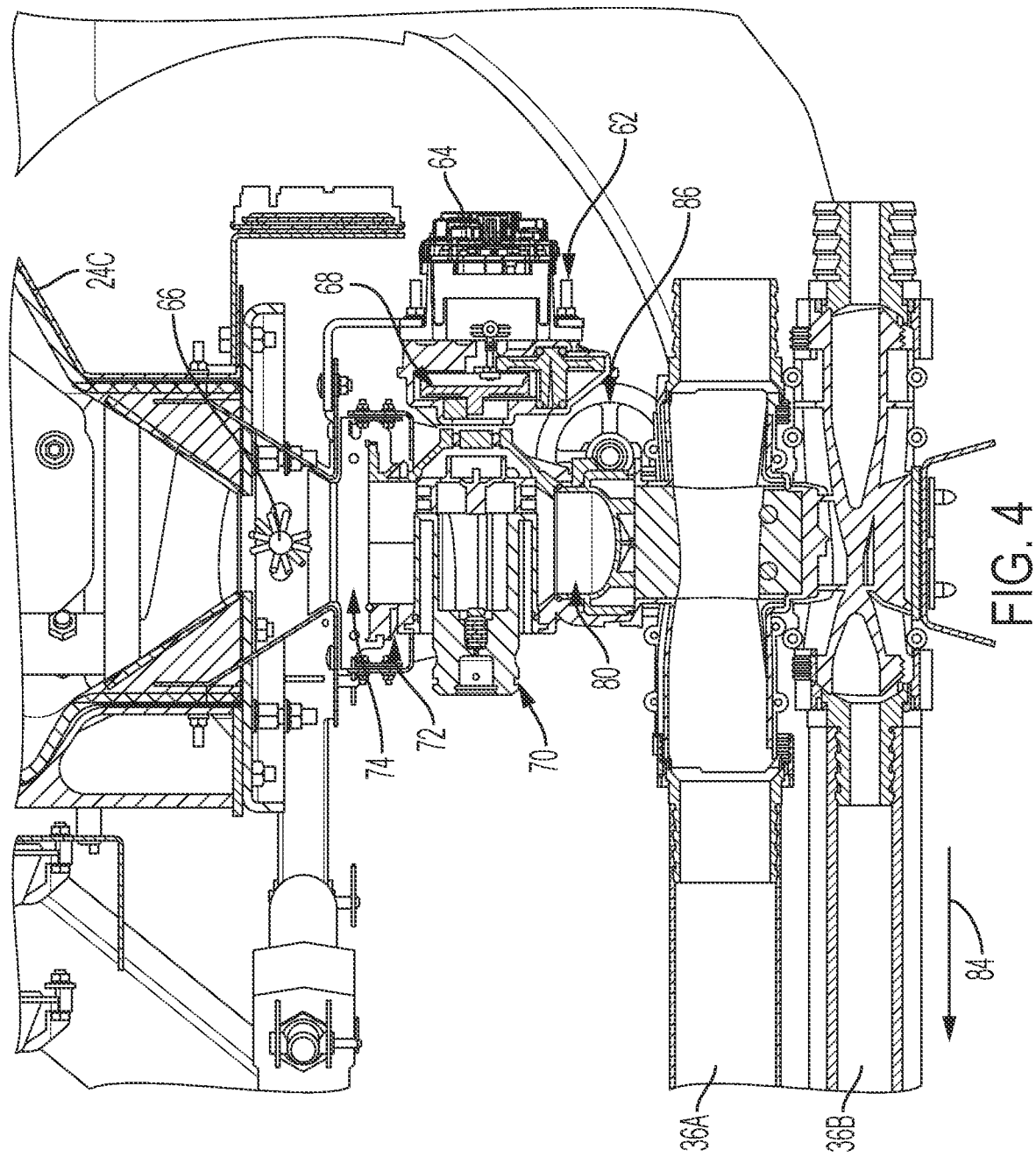
FIG. 4 is a sectional side view at a manifold of the distribution apparatus of FIG. 2.

FIG. 4 illustrates a sectional side view of the distribution apparatus 40 at the location of manifold 58C of FIG. 3. The tank 24C is located above and connected to the manifold 58C (as shown in this figure) to illustrate the configuration of the roller drivetrains 62, each of which includes one of the motors 64. At the bottom of the tank 24C, an agitator 66 receives material from the tank 24 to agitate the received material for proper flow to the roller drivetrain 62. The roller drivetrain, in addition to the motor 64, includes a gearbox 68 operatively connected to a rotating spindle of the motor 64. The gearbox 68 is operatively connected to a roller 70 located within a housing 72. Material flows from the tank 24C through the agitator 66 and to an inlet 74 of the housing 72. A shutoff is located at the inlet 74 of the housing 72 to either allow or to prevent material flow from the tank 24C to the roller 70. In another embodiment, the spindle of the motor 64 directly drives the roller 70.

The roller 70 receives material from the inlet 74 and rotates responsively to the gearbox 68 being driven by the motor 64. Material is captured by the roller 70 as described later herein and deposited into a receiving portion 80 of the housing 72. Depending on the position of a louver 82, as further described with respect to FIG. 5, the material falls under the influence of gravity into one of the distribution lines 36A or 36B. The material is then directed in the direction 84 by the appropriate blower, blower 26A or 26B, to the outlets 60 of the distribution lines 36. The position of louvers 82 is adjusted by a linkage, which is operatively connected to each of the louvers 82 of FIG. 5.

Figure 5:
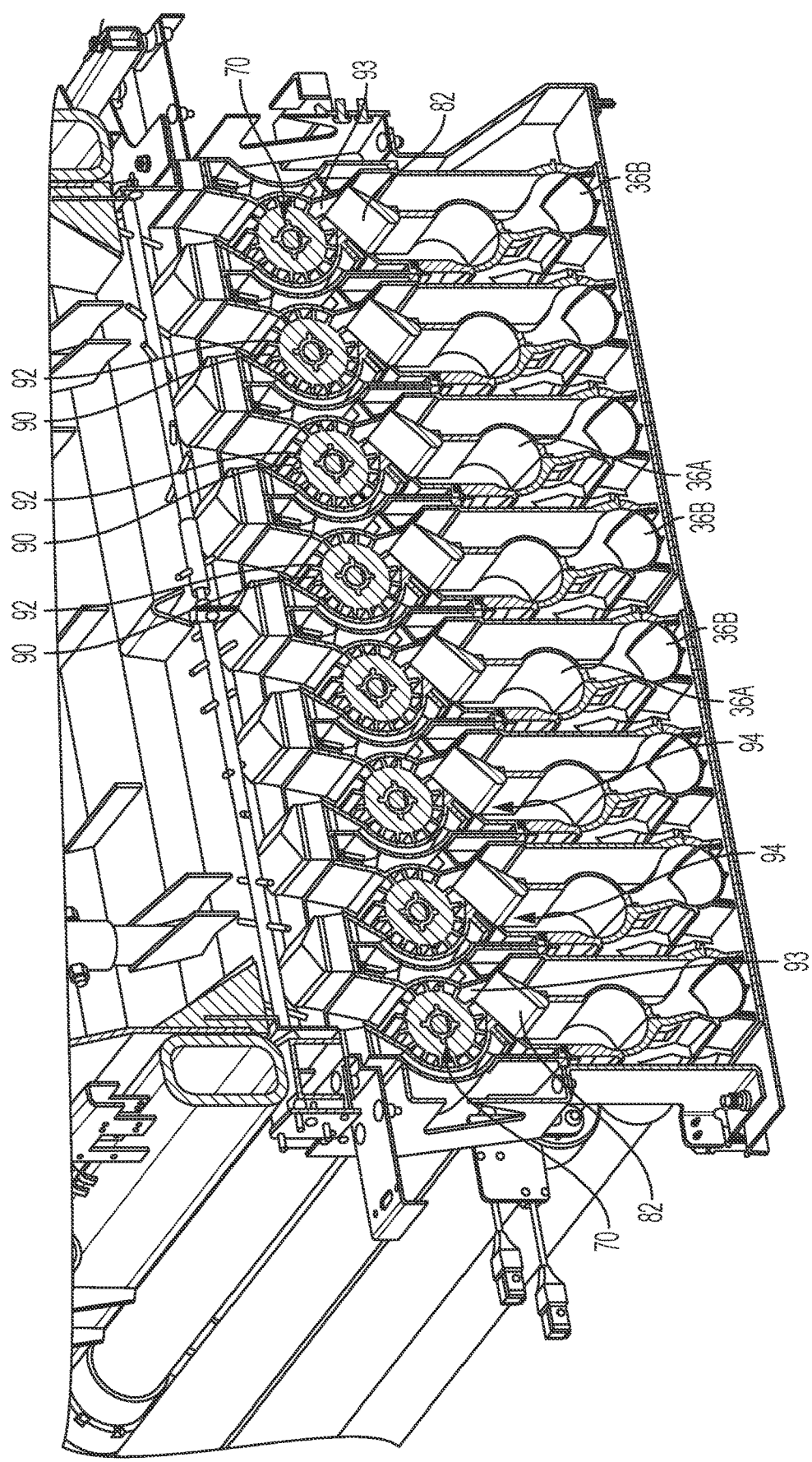
FIG. 5 is a perspective view at a manifold of the distribution apparatus of FIG. 2.

As seen in FIG. 5, each of the rollers 70 for each of the roller drivetrains 62 are located in a generally cylindrical cavity (disposed longitudinally) of the housing 72. The rollers 70 are illustrated as being sectioned between ends of the roller to illustrate a plurality of chambers 90 defined by a flute 92 located between the pockets 90. After the material flows through the agitator 66, each of the chambers receives an amount of material over a time period determined by the rotational speed of the motor 64 and the gear ratio of the gear box 68. As one of the flutes 92 of one of the pockets 90 moves past an interior wall 93 of the housing 72, the material located in the pocket 90 starts to fall. The material falls or drops from the cavity into a passage 94, a material drop point that is defined by the location of the louver 82. As seen in FIG. 5, the louvers 82 are directed to the right and the material drops into one of the distribution lines 36A. If the louvers 82 are directed to the left, the material drops into one of the distribution lines 36B.

Figure 6:
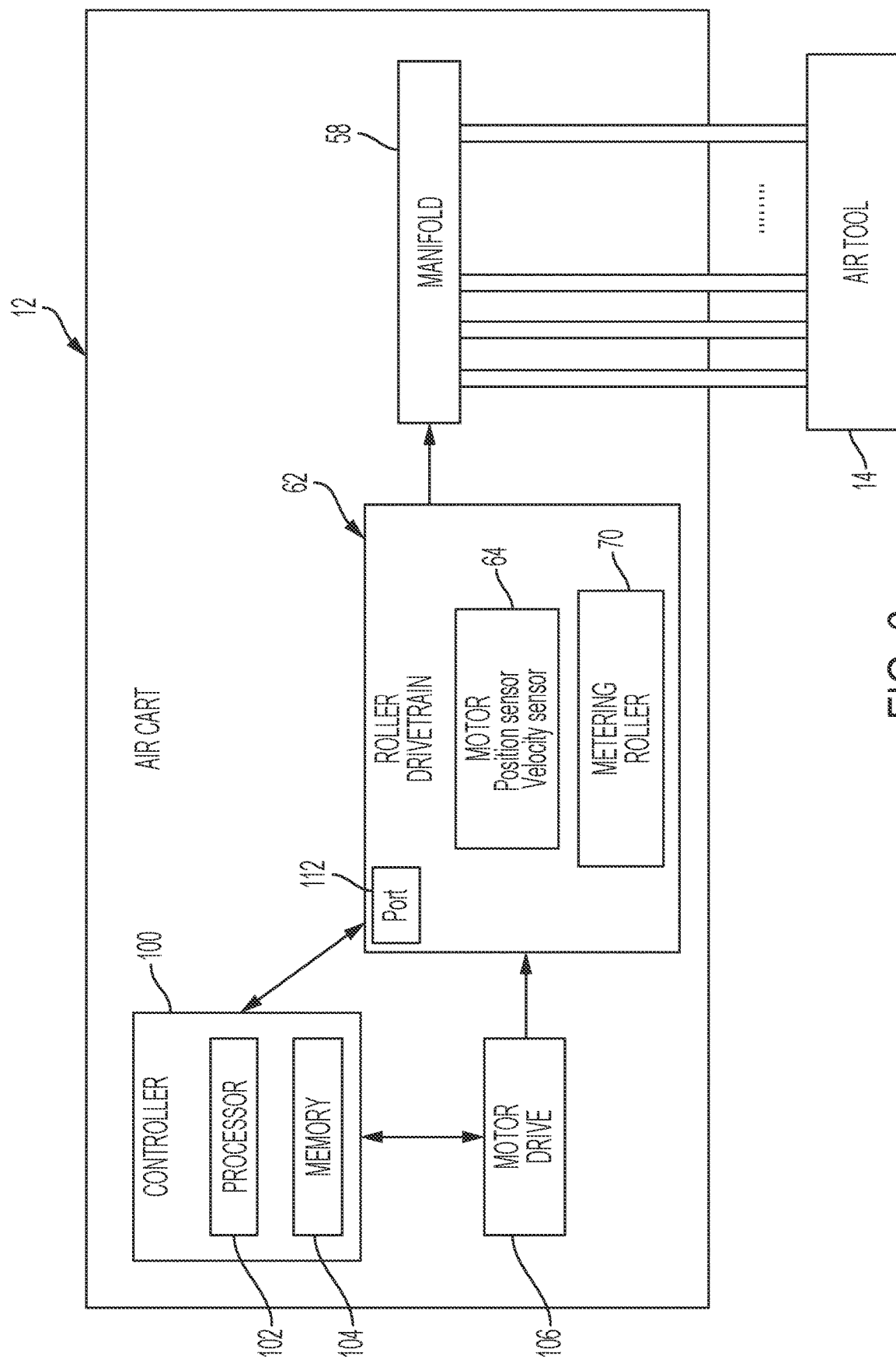
FIG. 6 is schematic block diagram of an air cart operatively connected to an air tool.

Each of the roller drivetrains 62 is operatively connected to a controller 100 as illustrated in FIG. 6. The controller 100, in different embodiments, includes a computer, computer system, or other programmable devices. In other embodiments, the controller 100 includes one or more processors 102 (e.g. microprocessors), and an associated memory 104, which can be internal to the processor or external to the processor 102. The memory 104 can include random access memory (RAM) devices comprising the memory storage of the controller 100, as well as any other types of memory, e.g., cache memories, non-volatile or backup memories, programmable memories, flash memories, and read-only memories. In addition, the memory in different embodiments includes a memory storage physically located elsewhere from the processing devices, including any cache memory in a processing device, as well as any storage capacity used as a virtual memory, e.g., as stored on a mass storage device or another computer coupled to controller 100. The mass storage device can include a cache or other dataspace which can include databases. Memory storage, in other embodiments, is located in the "cloud", where the memory is located at a distant location which provides the stored information wirelessly to the controller 100. When referring to the controller and the memory 104 in this disclosure, other types of controllers and other types of memory are contemplated.

The controller 100 executes or otherwise relies upon computer software applications, components, programs, objects, modules, or data structures, etc. Software routines resident in the included memory 104 operatively connected to the processor 102, or other memory, are executed in response to the signals transmitted to a motor drive 106. The motor drive 106 receives control signals from the controller 100 and provides a drive signal to the roller drivetrain 62 based on the control signals provided by the controller 100. The motor drive 106, in one or more embodiments, generates a drive signal that includes a power component and a frequency component to drive the motor 64. A spindle of the motor 64 is fixedly coupled to the metering roller 70. In another embodiment, the controller 100 is configured to include the motor drive 106.

The motor 64, in different embodiments, is an integrated motor including a motor and a controller having control capabilities including a processor that includes one or more of an encoder, an amplifier, a controller, and a communication port 112 operatively connected to the controller 100. The encoder is configured to identify a position of the spindle with respect to the body of the motor and to identify a speed or velocity of the spindle. The communication port 112 is configured to receive control signals from the controller 100 as well as to transmit status signals of the motor 64. The communication port 112 includes a motor input and a motor output. In one embodiment, the motor input is configured to receive power and a spindle driving signal to control the rotational speed of the spindle. The motor output drives the spindle.

In one embodiment, the motor 64 includes a velocity sensor to determine the rotational speed of the metering roller 70 and a position sensor to determine the position of the motor spindle, and therefore the metering roller 70, with respect to the motor 64. In one embodiment, the spindle, or shaft, includes a key configured to engage a receiving portion of the metering roller. When the key engages the receiving portion, the location of the spindle with respect to the motor is determined by the position sensor. The positional information of the position sensor is transmitted to the controller 100.

In one embodiment, each of the motors 64 is controlled by a different AC signal. Each of the AC signals, operatively connected to each of the motors 64, includes a sinusoidal waveform having a phase. In one embodiment, the phase of each of the AC signals are synchronized to be in phase. In other embodiments, the phase of each of the AC signals are synchronized to be out of phase, such that there is a phase difference between signals driving each of the motors. By staggering the phases between signals driving two or more or the motors 64, peak power consumption is reduced. In addition, by staggering the phases, torque load is also reduced. By making the phases for each of the signals to be out of phase, the load provided by the motors, in different embodiments, is minimized.

As described above, each of the roller drivetrains 62 is located in a generally cylindrical cavity of the housing 72. The housing 72 includes indexing features that orient the roller drivetrain 62 at a predetermined position, and therefore each of the motors 64 a fixed and known position within the housing 72. By fixing the location of the motor 64 within the housing, the position of the dividers with respect to the housing is known and the position of each of the dividers 92 with respect to the interior wall 93 is known. Consequently, positional information of the dividers 92 and therefore the chambers 90 is identified by the positional sensor, and the rotational velocity information of the divider moving past the interior wall is also identified.

By use of the integrated motor 64, precise control of motor speed is used to rotate the motor spindle to deliver product from the chamber 90. The motor 64 is driven at a varying rotation speed as opposed to the normal convention of a constant speed. The motor 64, and therefore the roller 70 delivers metered product in response to a time dependent or periodic control signal having two components: 1) a non-varying amplitude portion which corresponds to a targeted rate or rotational velocity (for instance a DC signal), and 2) a periodic signal portion with a frequency and a phase (for instance an AC signal) to reduce the pulsing effect currently associated with known metering designs. In different embodiments, the periodic signal includes a sine wave, a square wave, or a triangular wave signal. Other periodic signals are contemplated.

In a metering system having a constant velocity roller, the entire amount of material held in a chamber is completely released substantially all at the same time. This is known as pulsing. There are periods of material release separated by periods where little or no material is released. In the present disclosure, however, rotational speed of the roller is controlled using a motor controlled by a signal having a both frequency and amplitude component which reduces or substantially eliminates pulsing. The amplitude and phase shift of the periodic signal are determined such that the end result of the meter output is a reduced pulse effect (e.g. the amplitude (amount) of the released material is reduced) to the point where it is less noticeable, and in one or more embodiments no longer visibly detectable.

In order to determine the phase shift of the motor speed, the position of the roller relative to a material drop point and the position of the divider with respect to the wall of the housing is determined. In one embodiment, the flow of material being released from a roller chamber is detected at an inlet to a cavity where the material is released. The detected material flow beneath the roller chamber provides an indication of when to speed up rotation of the roller and to slow down rotation of the roller. In one example, the roller is rotated slowly enough so that the sinusoidal pulses, which in one embodiment include sinusoidal pulses of an AC signal superimposed on a DC signal and which become a half-rectified sine way as the DC signal approaches zero. This effect occurs because the seed being deposited does not vacuum seed back into the meter. At this location, the flow sensor is used to determine the position of the flute. In another embodiment, the dividers (flutes) of the chambers dragging on the walls of the housing, are monitored to determine a torque signal. In this embodiment, the motor is configured to provide a torque signal to the controller 100. In another embodiment, one of the flutes is made such that it extends past the other flutes to provide a higher drag, which when it crosses the material drop point would result in a reduction in rolling drag which can be detected by the motor 64 and transmitted to the controller 100.

In another embodiment, a second sensor directly determines the position of the roller relative to the housing.

Figure 7:
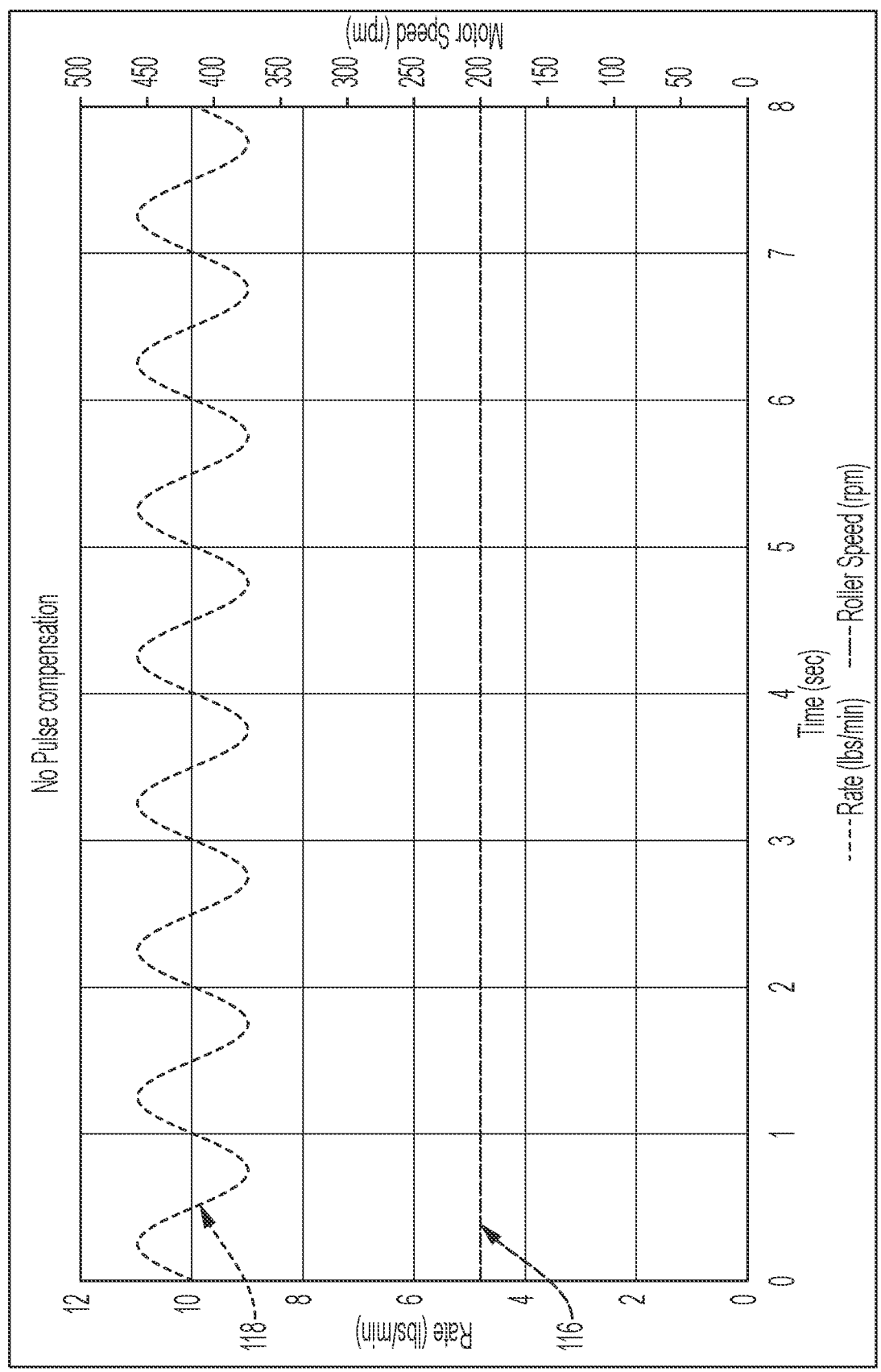
FIG. 7 illustrates a graphical representation of a metering device that does not include pulse compensation.

FIG. 7 illustrates a graphical representation of a metering device that does not include pulse compensation. In such an embodiment, a motor operatively connected to a roller is driven by a signal such that the roller is rotated at a constant speed 116. In such an embodiment, the motor is driven by a signal having a constant amplitude, such as a DC signal. When the roller is driven at a constant speed, a pulsing condition of the material being deposited is shown by a variable rate line 118 that represents a pulsing of or a variable delivery of material from the roller. As the roller rotates a large quantity of material is released from the roller as shown by the maximum amplitudes of the line 118. A small amount of material is released from the roller at the minimum amplitudes of the line 118.

Figure 8:
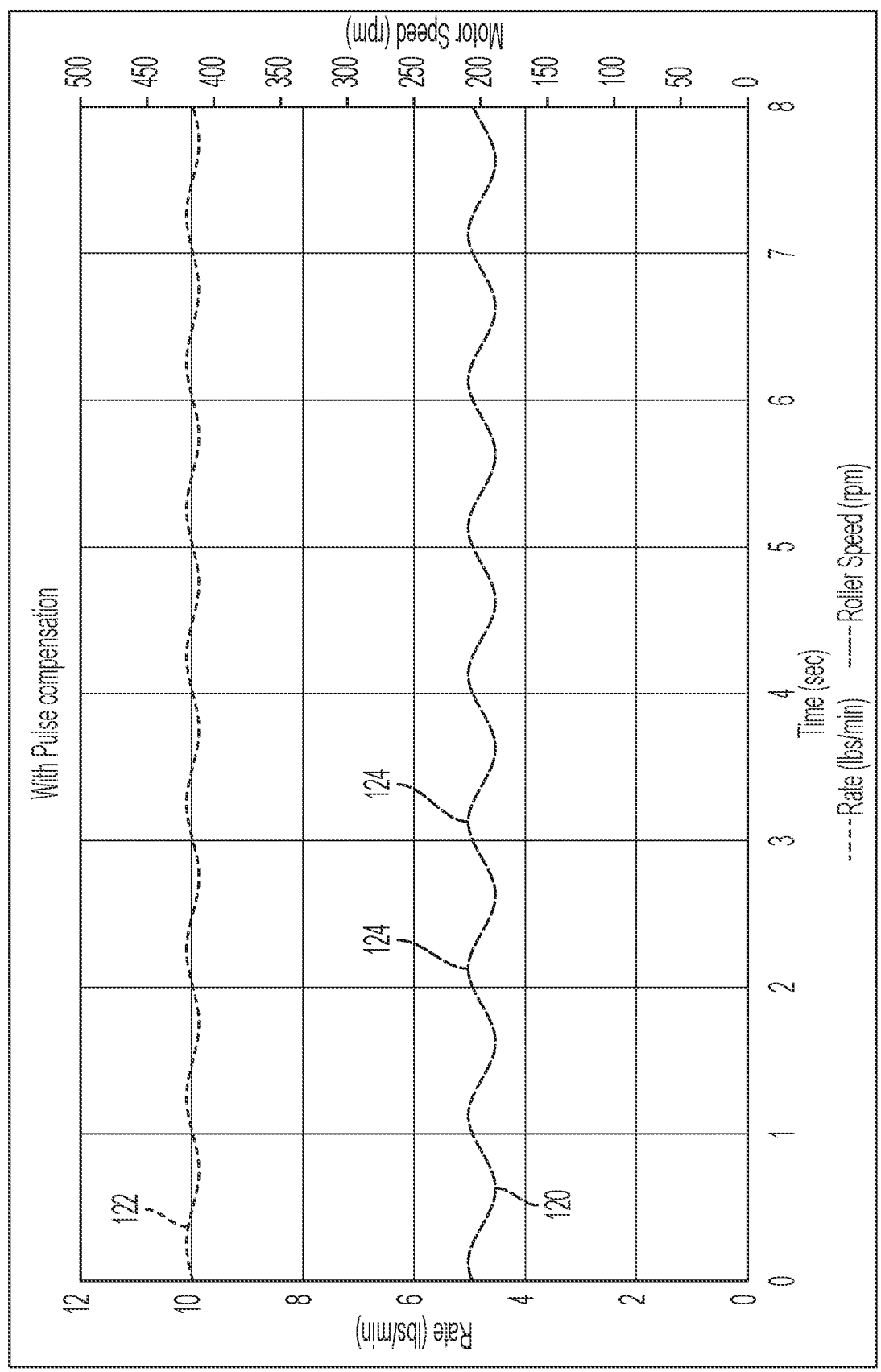
FIG. 8 is a graphical representation of one embodiment of a metering device of the present disclosure having pulse compensation.

FIG. 8 illustrates a graphical representation of one embodiment of a metering device of the present disclosure having pulse compensation. The motor 108 is driven by a variable rate signal 120 having a sine wave configuration. When rotating the roller with the variable rate signal 120, the pulsing condition of the material being deposited is substantially smoothed as shown by the signal line 122 that represents pulsing or a variable delivery rate of material being expelled from or deposited by the roller. By smoothing the pulsing condition of the material, variations in mass flow rate of the material being deposited is reduced.

To achieve the reduced pulsing of the material, the phase of the control signal 120 is adjusted to coincide with movement of the dividers moving past the sidewall of the material receiving chamber.

There are at least two methods for adjusting the phase shift of the motor drive signal. In a first method a mass flow sensor is employed in a feedback loop. The goal of the feedback loop is to obtain as close to a DC signal (a constant rate of material delivery) as possible (i.e. make the amplitude of the AC signal 118 of FIG. 7 constant). A second method employs a lookup chart contained within the controller 100. In this example, the controller 100 determines the roller displacement and speed, and applies a phase shift to the signal, wherein the phase shift is determined by the controller using the lookup table. The frequency of the signal, and therefore the rate of depositing the material, is determined by roller speed and number of flutes. In another embodiment, the amplitude of the signal is adjusted within the aforementioned feedback loop.

Figure 9:
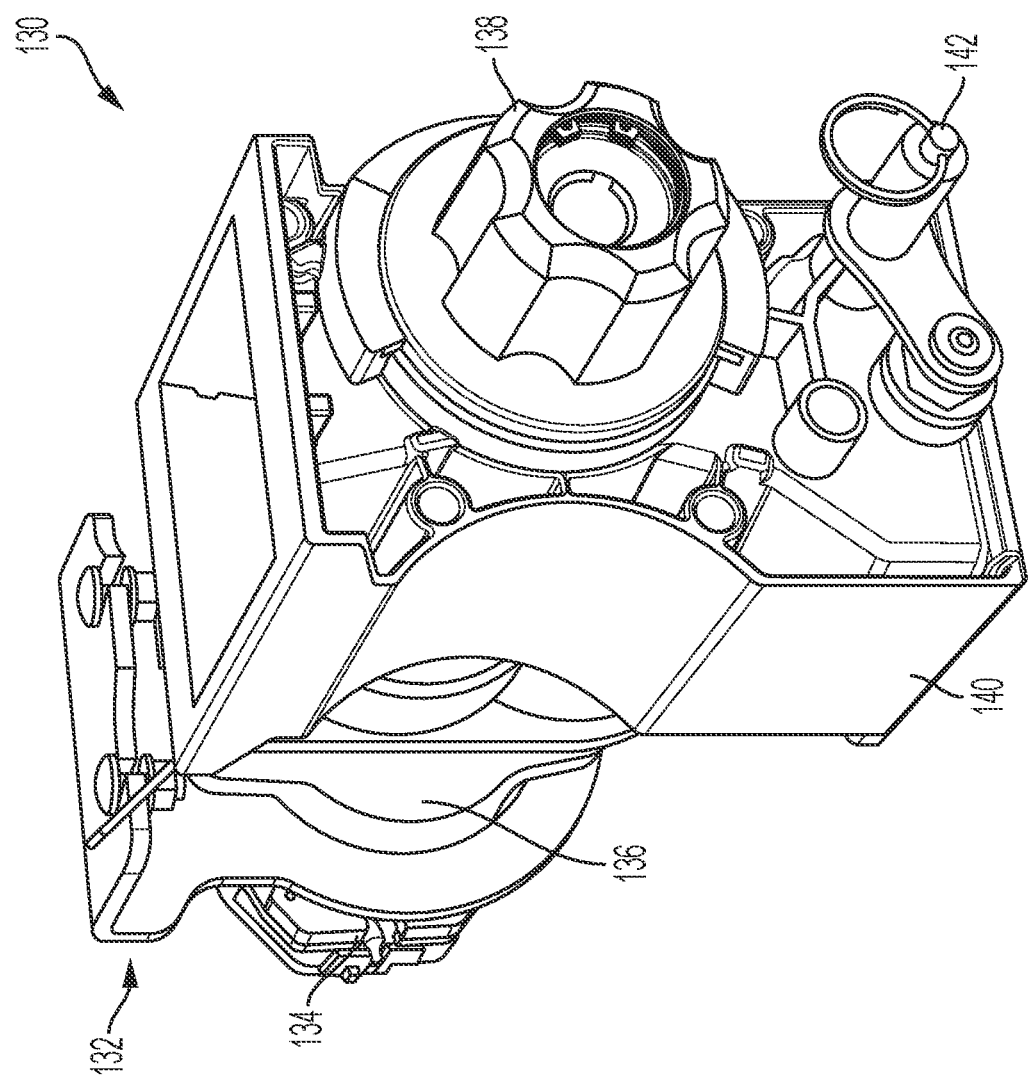
FIG. 9 is one embodiment of a metering device configured as unit to be located in a manifold of an air cart.

FIG. 9 illustrates one embodiment of a metering device 130 configured with a conveyance tube selector within the meter housing. The metering device 130 includes a motor drivetrain 132 including an integrated motor 134 operatively connected to a gearbox 136 which is operatively connected to a removable roller 138. The motor drivetrain 132 is supported by a housing 140. The metering device 130 includes an adjuster 142 including a handle to manually adjust a position of a louver, such as the louver 82 of FIG. 5.

Figure 10:
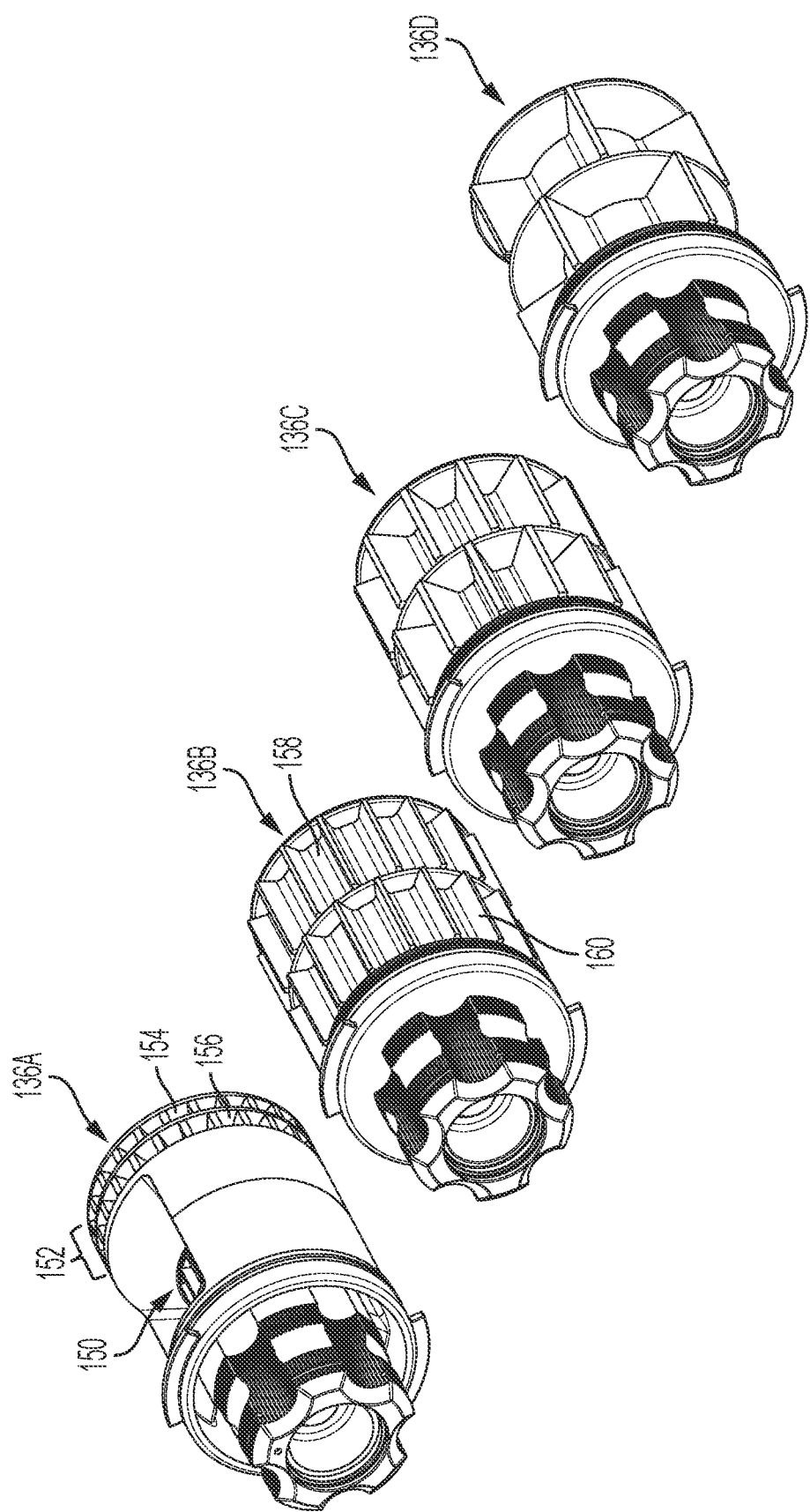
FIG. 10 illustrates a plurality of different embodiments of the roller of the metering device of FIG. 9.

The roller 136 is removably replaceable with rollers of different configurations. For example as seen in FIG. 10, roller 136A includes a cylinder 150 extending along a longitudinal axis of the roller. A portion 152 of the cylinder 150 of includes a first row of chambers 154 and a second row of chambers 156 located adjacently to the first row 154. The chambers of the adjacent rows 156 and 156 are offset from one another such a divider of one chamber is disposed adjacently to a central portion of the adjacent. Each of the chambers is equidistantly and radially spaced from a central axis 158 of the roller 136A.

A roller 136B includes a first row of chambers 158 and a second row of chambers 160 located adjacently to the first row. Each row of chambers include 20 chambers and consequently, each of the chambers includes a sufficient volume to hold approximately 166 cc. This size of chamber is adapted to deposit materials of a certain size. In one example of different sized rollers, roller 136A is for small seeds and fertilizers (~3 mm), rollers 136B and 136C are the general use for most seeds and fertilizers, and roller 136D is for very high rates of seed or fertilizer or large seeds (10 mm or more).

A roller 136C includes two rows of chambers similar to rollers 136A and 136B. In the configuration of roller 136C, the chambers are larger than the chambers of roller 136B. Likewise, the roller 136D includes two rows of chambers, each of which includes chambers larger that the chambers or roller 136C. Other sizes of chamber, other numbers or rows of chambers, and other radiuses of rollers are contemplated.

The delivery of material by each of the rollers 136A, 136B, 136C, and 136D is determined by a variable rate signal, such as the variable rate signal 120 of FIG. 7. Each driving signal 120, however, for each roller is determined based on the configuration of each of the rollers 136 of FIG. 9 and the speed at which material is delivered. For instance, the roller 136D includes larger chambers than the roller 136 B of FIG. 9, and consequently the driving signal for roller 136D is different than the one for roller 136B in different embodiments. In one embodiment, the roller 136D is driven at a lower velocity than the velocity of the rollers 136A, 136B, and 136C to achieve the same mass flow rate.

While this disclosure has been described with respect to at least one embodiment, the present disclosure can be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. An agricultural implement to deliver defined portions of a material from a larger quantity of the material to a material depositing apparatus comprising:
 a metering roller;
 a motor coupled to the metering roller; and
 a controller configured to transmit a motor drive signal for an operation of the motor to provide a force that is transmitted to drive the metering roller, the controller configured to determine a pulse speed rate at which the motor drive signal is adjusted to provide a pulse compensation for a rate the material is released from the metering roller.

2. The agricultural implement of claim 1 further comprising a housing about which the metering roller is rotatably displaced, and wherein the controller is configured to adjust, for the pulsed speed rate, a phase of the motor drive signal to coincide with a position of the metering roller relative to the housing.

3. The agricultural implement of claim 2 wherein the controller is further configured to determine a first position comprising a position of the metering roller relative to a material drop point of the housing, and determine a second position comprising a position of a divider of the metering roller relative to a sidewall of the housing, and wherein the controller uses both the first position and the second position in the determination by the controller of the pulsed speed rate.

4. The agricultural implement of claim 2 wherein the controller receives a torque signal from the motor, the torque signal corresponding to a level of drag generated by a rotation of a plurality of flutes of the metering roller against the housing, and wherein the controller uses the torque signal in the determination by the controller of the pulsed speed rate.

5. The agricultural implement of claim 1 further comprising a housing configured to house a rotation of the metering roller, wherein the metering roller comprises a plurality of dividers, a first divider of the plurality of dividers configured to provide a drag force against a sidewall of the housing during a rotation of the metering roller that is larger than a drag force provided by each of the other dividers of the plurality of dividers, and wherein a change in the drag force corresponding to a displacement of the first divider across a material drop point of the housing is used by the controller to determine a position of the metering roller.

6. The agricultural implement of claim 1,
 wherein the metering roller comprises a plurality of chambers and a plurality of dividers, each chamber of the plurality of chambers being separated from an adjacent chamber of the plurality of chambers by a divider of the plurality of dividers and configured to receive a portion of the material, and
 wherein a frequency and an amplitude of the motor drive signal reduces a variability in a mass flow rate of the material expelled during, and between, periods in which the material is being dispensed from one or more chambers of the plurality of chambers.

7. The agricultural implement of claim 1 wherein the pulsed speed rate includes a periodic change in a velocity to move a divider of the metering roller past a sidewall of that defines part of a manifold space of a manifold at a first velocity and to move the divider past a central portion of the manifold space at a second velocity.

8. The agricultural implement of claim 7 wherein the first velocity is a higher velocity than the second velocity.

9. The agricultural implement of claim 7 wherein the motor drive signal includes a phase, wherein the phase aligns the divider of the metering roller with the sidewall during rotation of the metering roller to reduce pulsing.

10. A method of metering a flow of a material dispensed from an agricultural implement and delivered to a commodity cart, the method comprising:
 agitating the material in the agricultural implement to provide a loose aggregate of the material;
 delivering the material to a metering roller;
 rotating the metering roller at a pulse speed rate to reduce a pulsing in a mass flow rate of the material expelled from the metering roller; and
 delivering the material from the metering roller to a housing for delivery to the commodity cart.

11. The method of claim 10 wherein the rotating step including rotating the metering roller at the pulse speed rate with a periodic waveform having an amplitude and a phase, the periodic waveform being a sine wave, a square wave, or a triangular wave signal.

12. An agricultural implement to deposit an agricultural material from a tank into or onto soil of a field, the agricultural implement comprising:
 a roller drivetrain coupled to the tank to receive the agricultural material, the roller drivetrain including a metering roller coupled to and rotated by a force generated by a motor, wherein the metering roller includes a row of chambers and a plurality of dividers and is located within a housing; and
 a controller operatively connected to the roller drivetrain, wherein the controller transmits a control signal comprising a pulse speed rate that adjusts a velocity of the metering roller to reduce a pulsing effect with respect to a mass flow rate of the agricultural material being dispensed from the metering roller.

13. The agricultural implement of claim 12 wherein the housing includes a sidewall and the phase of the control signal is adjusted to coincide with movement of the plurality of dividers moving past the sidewall of the housing.

14. The agricultural implement of claim 13 further comprising a motor drive coupled to the controller and to the roller drivetrain wherein the motor drive transmits a drive signal to the motor based on the control signal transmitted by the controller.

15. The agricultural implement of claim 13 wherein the drive signal rotates the metering roller at a varying rotation speed about an axis of the metering roller.

16. The agricultural implement of claim 12 wherein the pulse speed rate reduces a variability in the mass flow rate during, and between, periods in which the agricultural material is being dispensed from one or more chambers of the row of chambers.

17. The agricultural implement of claim 16 wherein the motor includes a velocity sensor to determine a rotational speed of the metering roller and a position sensor to determine a position of the metering roller with respect to the motor.

18. The agricultural implement of claim 16 wherein the motor is an integrated motor including a controller having control capabilities having a processor that includes one or more of an encoder, an amplifier, a controller, and a communication port.

19. The agricultural implement of claim 16 wherein the motor provides a torque signal based on the plurality of dividers dragging on the sidewall of the housing.

20. The agricultural implement of claim 12 wherein the control signal is based on a size of each of the chambers in the row of chambers and a speed at which the agricultural material is delivered.

* * * * *